United States Patent Office 3,098,286
Patented July 23, 1963

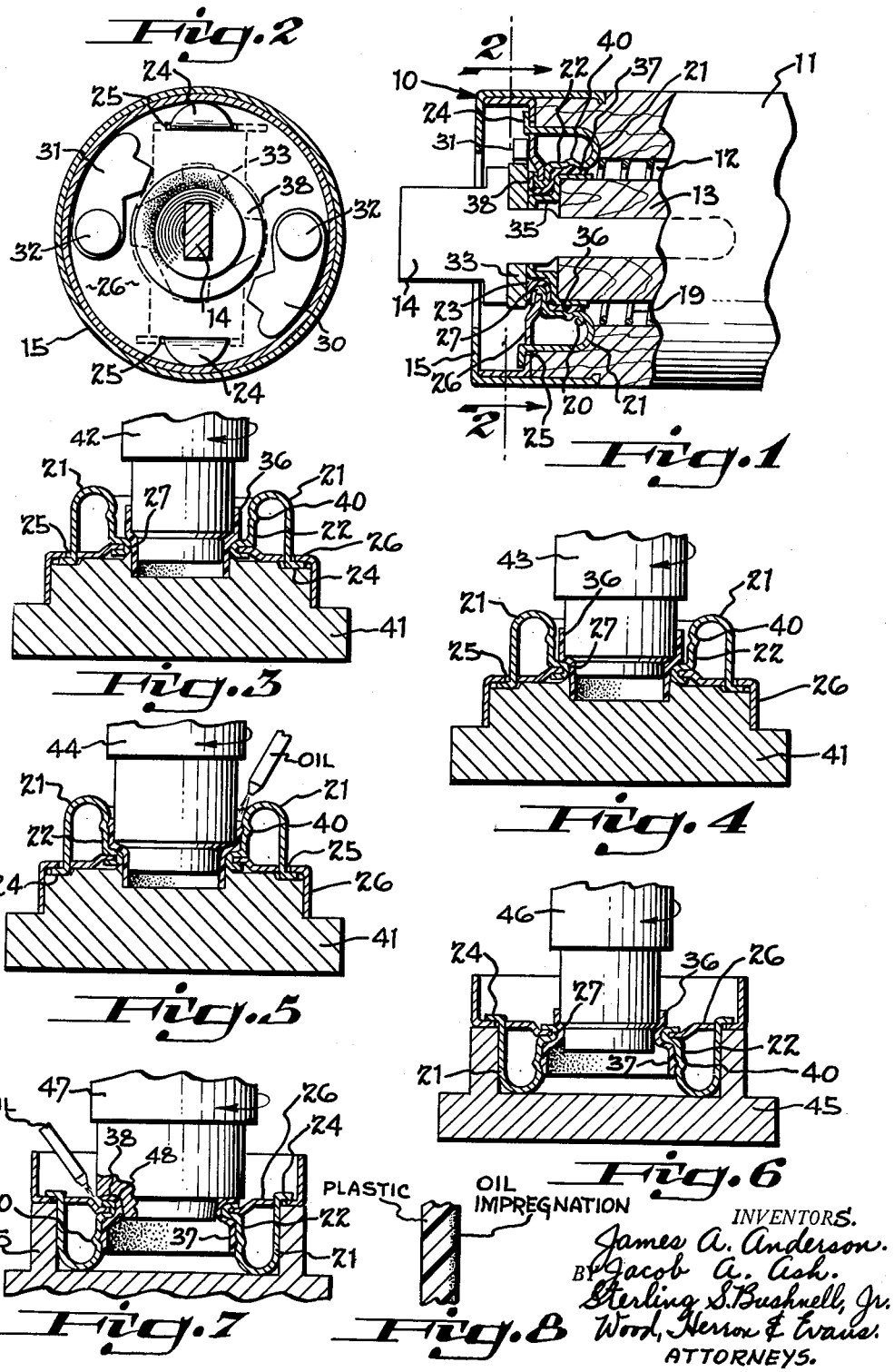

3,098,286
BEARING FOR WINDOW SHADE ROLLER
James A. Anderson, Jacob A. Ash, and Sterling S. Bushnell, Jr., Muskegon, Mich., assignors to Breneman-Hartshorn, Inc., Cincinnati, Ohio, a corporation of Ohio
Filed Apr. 18, 1960, Ser. No. 22,901
8 Claims. (Cl. 29—149.5)

This invention relates to a bearing construction for a window shade roller.

The invention is directed particularly to a window shade roller of the type having a cylindrical roller, a hub on one end of the roller having a ratchet and pawl, and the hub having a stick cup rotatably receiving a spring biased stick or spindle which is fixed to the ratchet.

In window shade rollers, precise machining of the parts which comprise the operating mechanism is not necessary for the successful operation of the reeling mechanism. As a consequence, the parts of the mechanism are manufactured with comparatively large tolerances, thereby providing economy of manufacture and ease of assembly. However, the parts of the mechanism, not being precisely machined, give rise to undesirable noise during the winding and unwinding of a window shade.

It has been an objective of the invention to eliminate or at least to provide a substantial reduction in the noise of operation of the window shade reeling mechanism and otherwise to improve the operation of the mechanism. In furtherance of this objective, we propose to provide a nylon bearing surface between parts, the relative motion of which gives rise to the major portion of the noise.

No known nylon bearing is satisfactorily adaptable for use in the window shade reeling mechanism, nor is there a known process for forming the nylon bearing in the reeling mechanism with the attendant requirements of economy and performance.

It has been another objective of the invention to provide, in a window shade reeling mechanism, a single nylon bearing which will eliminate noise arising from the rotation of the spring biased stick or spindle with respect to the stick cup and the noise arising from the relative rotation of the ratchet in the window shade hub.

Further, the invention contemplates an improved method of forming and contouring a nylon bearing on the stick cup. In the past nylon bearings have been applied to certain types of receptacles by a molding process. Such a process requires molding equipment which may not be well suited to the economics of window shade manufacturing. In accordance with the present invention the nylon bearing is applied to a stick cup by a spinning or staking operation which requires only a work piece holder and a mechanism for rotating a fastening tool. By means of the present invention, it is not only possible to shape the bearing to the contour of the stick cup, but additionally it is possible to provide the nylon bearing with a circumferential flange which serves to secure the bearing in the stick cup, the flange additionally providing a bearing surface for the ratchet.

Where fastening of the bearing is accomplished by the use of a spinning tool, we find, that by applying a film of lubricant to the surface of the spinning tool, the heat and pressure of the spinning tool on the nylon surface causes the nylon bearing to be impregnated with the lubricant, the lubricant enhancing the operation of the window shade reeling mechanism.

While it is stated that the nylon surface is impregnated with oil, the characteristics of nylon and oil would appear to negate this possibility. The exact mechanism by which oil is retained by the nylon is not known. The oil may be chemisorbed. In any event, the lubricity of the resultant product is definitely improved.

These and other features of the invention will become more readily apparent from a consideration of the full detailed description taken in conjunction with the following drawings in which:

FIG. 1 is a cross sectional view partly in elevation of the window shade roller mechanism;

FIG. 2 is a cross sectional view taken along lines 2—2 of FIG. 1;

FIGS. 3, 4 and 5 are diagrammatic views illustrating the method of spinning a nylon bearing into the stick cup;

FIGS. 6 and 7 are diagrammatic views illustrating the method of spinning the bearing flange; and FIG. 8 is a fragmentary cross sectional view of a bearing formed in accordance with the invention.

The invention is directed particularly to a bearing for a winding or reeling mechanism 10 which is mounted on a roller 11 having a central bore 12. The reeling mechanism is generally of the type shown and described in Patent No. 2,427,298 and comprises a stick or spindle 13 rotatably mounted in the central bore 12, the stock 13 having a tang 14 fixed thereto and projecting outwardly through an aperture in a hub cover, 15, the hub cover being secured to the end of the roller 11. The projecting portion of the tang will be received in a bracket mounted on a window frame to prevent rotation of the tang and stick 13 with respect to the window frame.

A spring 19 is fixed at one end, not shown, to the stick 13 and is fixed at its other end 20 to a stick cup 21. The stick cup is secured to the roller 11 so that rotation of the roller 11 with respect to the fixed tang 14 and stick 13 in a first direction will wind up the spring 19, the spring 19 tending to unwind to urge the roller in a reverse direction.

The stick cup 21 has a cup-shaped portion 22 which has a central aperture 23 in the bottom thereof. A pair of integral tabs 24 project from the upper edge of the cup, the tabs being bent through 180° to pass through slots 25 in a generally planar hub 26.

The hub 26 has a central aperture coincident with the aperture 23 of the stick cup. The edge portion of the stick cup 21 which forms the aperture 23 is spun onto the aperture edge of the hub 26 as at 27. Thus, the stick cup is secured to the hub at three places, namely, about the aperture edge and at the two tab in-slot connections.

The hub 26 has two pawls 30 and 31 pivotally mounted thereon by rivets 32. The pawls cooperate with a ratchet 33 fixed to the tang 14. The ratchet and pawl mechanism operates in a known manner to prevent the spring 19 from returning the roller 11 in a direction to unwind the spring. The pawls will, however, permit such return when the centrifugal force developed by the rotation of the roller prevents the pawls from moving into engagement with the ratchet mounted on the fixed tang.

The stick or spindle 13 is provided with a ferrule 35 at its end, the ferrule being in rotative engagement with the cup portion 22 of the stick cup. The metallic engagement of the ferrule 35 with the stick cup 21 and the ratchet 33 with the hub 26 gives rise to an objectionable noise during the operation of the reeling mechanism. To eliminate the noise, the invention provides a nylon bearing 36 having a cup-shaped portion 37 which follows the contours of the cup portion 22 of the stick cup. The bearing 36 also has a flanged portion 38 which projects through the aperture 23 and forms a bearing surface upon which the ratchet 33 may rotate. The flange portion 38 also serves to retain the bearing securely in the stick cup.

The stick cup 21 may be provided with splines, ridges or recesses as at 40 into which the nylon will be forced during the bearing forming operation in order to prevent rotation of the bearing with respect to the stick cup. While the splines 40 are shown in cup portion 22 of the stick cup, it should be understood that they may be formed, alternatively or additionally, in throat portion formed at 27.

One manner of forming the bearing in the cup portion of the stick cup is illustrated in FIGS. 3, 4 and 5. The stick cup hub assembly is mounted on a block 41 which serves as a work piece holder and a cylindrical nylon sleeve having the dimension shown at the lower portion thereof is positioned in the aperture 23 of the stick cup. Preliminary splining of the throat portion 27 of the stick cup will tend to prevent rotation of the sleeve during the forming operations. A first tool 42, rotating at approximately 1700 r.p.m., for example, spin-forms the upper portion of the nylon sleeve to a first size illustrated by FIG. 3. That tool is withdrawn and a second tool 43 of larger size spin-forms the upper portion of the nylon bearing 36 to the size illustrated in FIG. 4.

As illustrated in FIG. 5, a third still larger tool 44 spins the sleeve into snug engagement with the walls of the cup portion 22 so that the bearing follows the contours of the cup portion 22. The bearing material is also forced into the recesses 40 which secure the bearing against relative rotation with respect to the stick cup.

Prior to the final operation or after the final shaping has been completed, mineral oil is applied and the tool 44 is moved into engagement with the bearing 36, whereby the heat and pressure of the tool on the bearing 36 causes a surface impregnation of lubricating oil into the nylon bearing. Preferably, the oil is applied merely by spraying a film onto the surface of the tool.

The number of forming operations may be reduced and the forming process improved by heating one or more of the forming tools. The heating may be performed in a known manner as by attaching a thermostatically controlled electrical heating element to the tool. Such heating may supplement the spinning operations by being interspersed between the spinning steps, and it can be performed with reduced rotation of the spinning tool.

The forming of the flange 38 is performed as illustrated in FIGS. 6 and 7. The stick cup and hub assembly is mounted in a jig 45 and a first tool 46 spins the projecting portion of the nylon sleeve partially to form the flange 38. Thereafter a tool 47 of larger size is brought into engagement with the projecting portion of the nylon sleeve to complete the formation of the flange 38. It will be noted from FIG. 7 that the forming surface of the tool 47 is slightly undercut as at 48 to assure firm engagement of the flange 38 with the hub and stick cup assembly. Lubricating oil again may be added in the final forming operation. The surface of the bearing resulting from the forming operation with the oil impregnated is illustrated in FIG. 8.

When the shade is unrolled to the desired length and is held momentarily, one of the pawls 30—31 will drop into engagement with ratchet 33 and hold the roller and spring 19 in stressed condition.

To roll the shade onto the roller the shade is pulled slightly to disengage pawl from ratchet 33, and thereafter comparatively rapidly released. The spring 19, in unwinding, rotates the roller at a sufficient speed to maintain pawls 30—31 out of engagement with ratchet 33 by the centrifugal force imparted to them.

In both the rolling and unrolling of the shade, the provision of the lubricated nylon bearing prevents noisy rotative engagement of both the ferrule and the ratchet against the metallic parts about which they rotate.

The thus formed stick cup and hub assembly is employed in completing the roller assembly for a window shade so that the parts will cooperate in the manner described above. When in operation, pulling a shade, that is unrolling a shade from the roller, causes the roller and the stick cup fixed thereto to rotate about the stick or spindle 13, the stick 13 being fixed by means of tang 14 to the window frame. Specifically, the stick cup and bearing 36 rotate about ferrule 35 on the end of stick 13. The pulling on the shade to unroll it from the roller and the consequent rotation of the roller causes the spring 19 connected at its ends to the stick and stick cup respectively, to be stressed.

Having described our invention we claim:

1. In a window shade, the method of forming a bearing for a cup assembly comprising the steps of forming a stick cup having a cup shaped portion and an aperture through which a tang passes, inserting a nylon sleeve in said cup to project through said aperture, spinning said sleeve against the internal contour of said stick cup, applying oil to the internal surface of said sleeve during said spinning step so that the heat and pressure of the spinning operation will impregnate said bearing with oil, and spinning said sleeve over the bottom of said cup.

2. In a window shade, the method of forming a bearing for a cup assembly comprising the steps of forming a stick cup having a cup shaped portion and an aperture through which a tang passes, inserting a nylon sleeve in said cup, spinning said sleeve against the internal contour of said stick cup, and applying oil to the internal surface of said sleeve during said spinning step so that the heat and pressure of the spinning operation will impregnate said bearing with oil.

3. In a window shade, the method of forming a bearing for a cup assembly comprising the steps of forming a stick cup having a cup shaped portion and an aperture through which a tang passes, inserting a nylon sleeve in said cup, applying a rotating tool to said sleeve to spin said sleeve against the internal contour of said stick cup, and applying oil to the surface of said tool before said spinning step so that the heat and pressure of the spinning operation will impregnate said bearing with oil.

4. In a window shade, the method of forming a bearing for a cup assembly comprising the steps of forming a stick cup having a cup shaped portion and an aperture through which a tang passes, inserting a nylon sleeve in said cup, serially applying rotating shaped tools of gradually increasing diameter to said sleeve to spin said sleeve against the internal contour of said stick cup, and applying oil to the internal surface of said sleeve during said spinning step so that the heat and pressure of the spinning operation will impregnate said bearing with oil.

5. In a window shade, the method of forming a bearing for a cup assembly comprising the steps of forming a stick cup having a cup shaped portion and an aperture through which a tang passes, inserting a nylon sleeve in said cup, serially applying rotating, shaped tools of gradually increasing diameter to spin said sleeve against the internal contour of said stick cup, and applying oil to the surface of at least one of said tools before said tool is applied to said sleeve so that the heat and pressure of the spinning operation will impregnate said bearing with oil.

6. The method of forming a bearing in a support comprising the steps of inserting a nylon sleeve in said support, spinning said sleeve against the internal contour of said support, and applying oil to the internal surface of said sleeve during said spinning step so that the heat and pressure of the spinning operation will impregnate said bearing with oil.

7. The method of forming a bearing support comprising the steps of inserting a nylon sleeve in said support, applying heat and pressure to said sleeve to deform said sleeve to conform to the contour of said support, and applying oil to the exposed surface of said sleeve during the application of heat and pressure to impregnate the surface of said sleeve with oil.

8. The method of forming a bearing in a contoured stick cup for a window shade roller comprising the steps of inserting a nylon sleeve in said cup, spinning said sleeve against the internal contour of said cup and, simultaneously with said spinning step, applying heat to said sleeve in addition to that generated by said spinning operation.

References Cited in the file of this patent
UNITED STATES PATENTS

| | | |
|---|---|---|
| 1,942,787 | Watts | Jan. 9, 1934 |
| 2,024,142 | Burns | Dec. 17, 1935 |
| 2,427,298 | Morpeth | Sept. 9, 1947 |
| 2,560,134 | Schroeter | July 10, 1951 |
| 2,644,199 | Miller | July 7, 1953 |
| 2,732,613 | Renholts | Jan. 31, 1956 |
| 2,795,039 | Hutchins | June 11, 1957 |
| 2,881,509 | Gadebusch | Apr. 14, 1959 |
| 2,884,283 | Korol | Apr. 28, 1959 |